Jan. 3, 1967  F. D. BARBER  3,295,463
RAILROAD CAR STABILIZING LIMIT AND SIDE BEARING MEANS
Filed Nov. 22, 1965  2 Sheets-Sheet 1

INVENTOR.
BY Franklin D. Barber,
Attorneys.

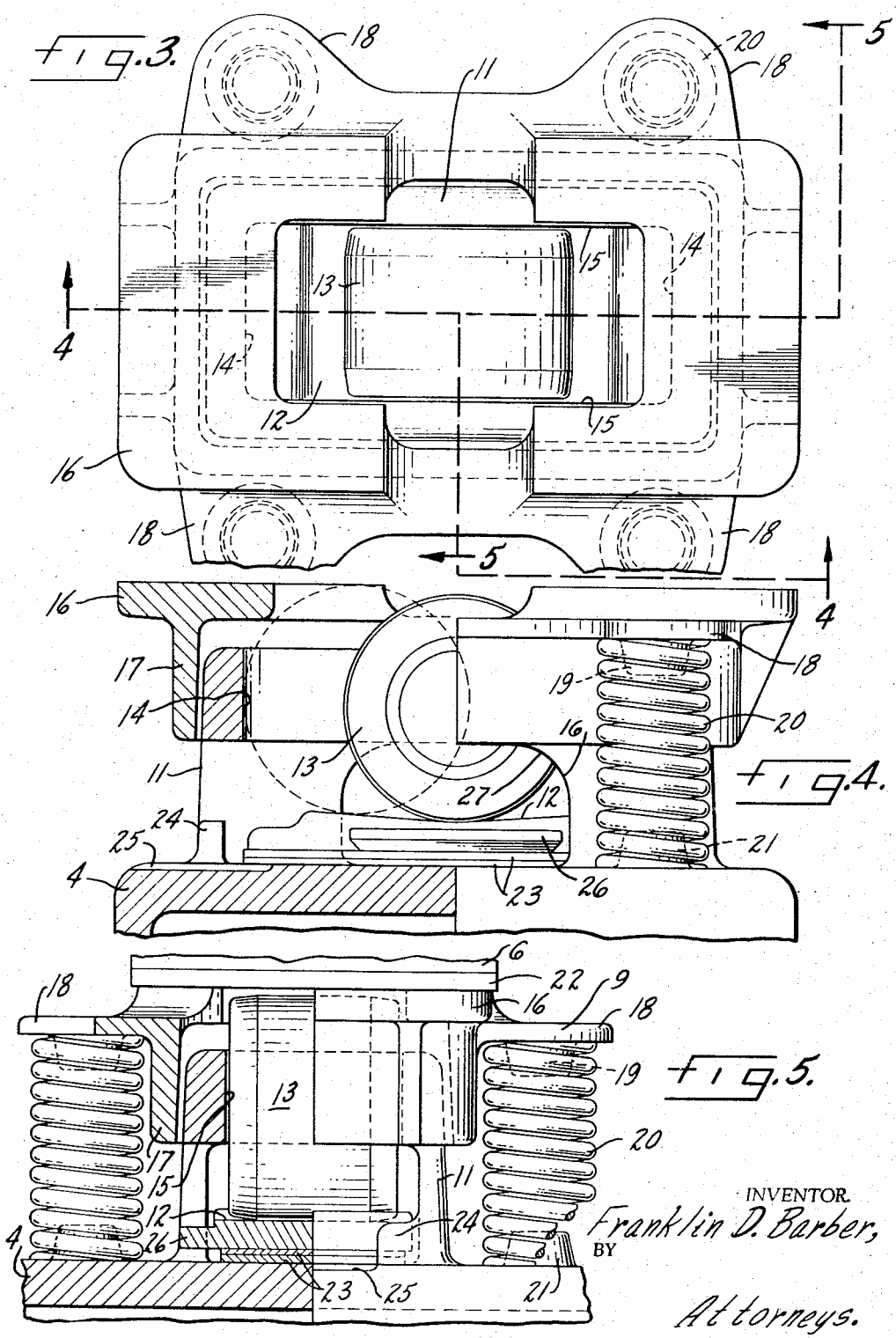

United States Patent Office 3,295,463
Patented Jan. 3, 1967

3,295,463
RAILROAD CAR STABILIZING LIMIT AND
SIDE BEARING MEANS
Franklin D. Barber, Chicago, Ill., assignor to Standard Car Truck Company, Chicago, Ill., a corporation of New Jersey
Substituted for abandoned application Ser. No. 291,479, June 28, 1963. This application Nov. 22, 1965, Ser. No. 508,921
4 Claims. (Cl. 105—199)

This application is a substitute with additional material for application filed by Franklin D. Barber of Chicago, Illinois, on June 28, 1963, Serial Number 291,479, entitled "Railroad Car Stabilizing Side Bearings," which application became abandoned on October 14, 1964.

This invention relates to improvements in side bearings for railroad cars, effective, positively, to limit side to side rocking of the car on the truck and to provide friction means effective to damp out shimmying or high frequency angular movement of the truck about a vertical axis without preventing normal relative movement of car and truck.

Side bearings are basically designed to operate intermittently to prevent excessive rolling of the car rather than to prevent normal car lean on a curve. Excessive rocking of the car can build up in the absence of anti-friction means in the side bearing such pressure as might tend to prevent swivelling of the truck as the car passes around a curve. It was the consensus of the art that such accidentally produced friction was harmful to rails and wheels, and as a result anti-friction devices were included in the side bearings, The adoption of roller axel bearings having a much greater tendency to shimmy than the early babbit or brass type of truck bearings made it desirable to provide friction damping means to control shimmying.

Excessive anti-shimmying pressure may interfere with the normal and necessary freedom of the truck to negotiate a curve tending to lock the truck and cause excessive flange and rail wear and sometimes derailment. Inadequate pressure will not inhibit shimmying.

This invention proposes spring pressed damping means which frictionally tend to inhibit harmonic build up or hunting without seriously interfering with the normal pivotal function of the truck. The anti-friction means which positively limit the compression of the friction applying springs control the anti-shimmying friction damping pressures and positively prevent such excessive friction as might cause undue wheel and track wear or derailment.

Other objects will appear from time to time throughout the specification and claims.

The invention is illustrated more or less diagrammatically in the accompanying drawings, wherein:

FIGURE 3 is a plan view of the side bearing;

FIGURE 4 is an elevation in part section along the line 4—4 of FIGURE 3;

FIGURE 5 is an elevation in part section along the line 5—5 of FIGURE 3.

Like parts are indicated by like characters throughout the specification and drawings.

Figure 1:
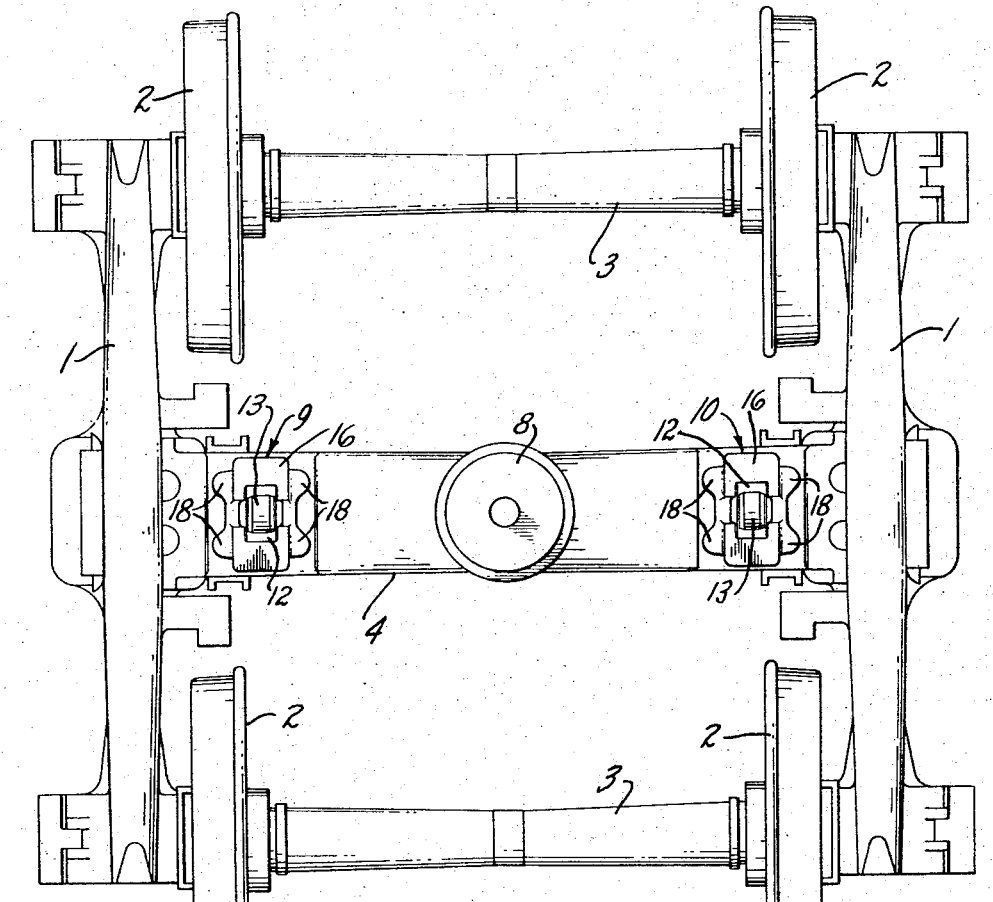
FIGURE 1 is a plan view of a railroad car truck showing the location of the side bearings.
Figure 2:
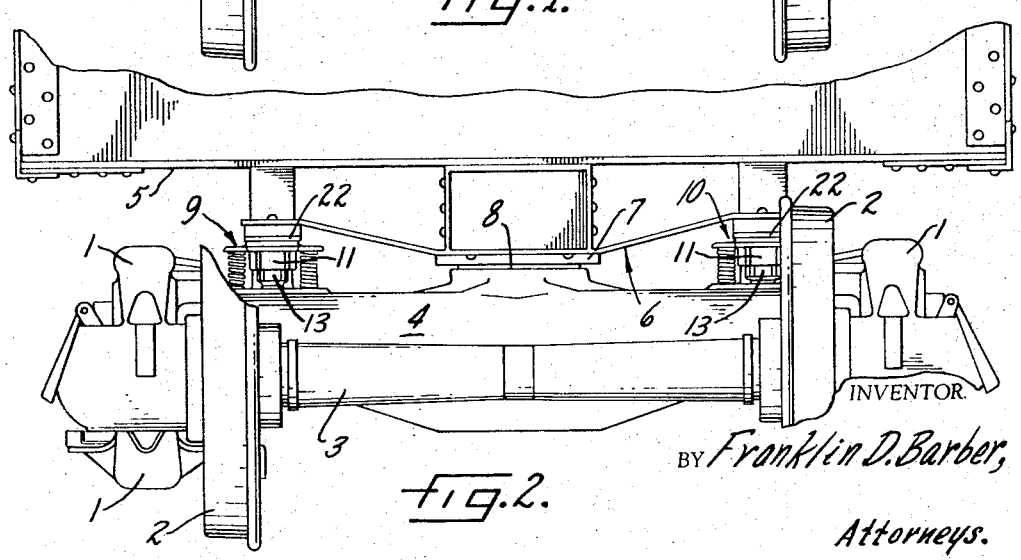
FIGURE 2 is a front elevation of the truck of FIGURE 1 showing the car body in position.

A railroad car truck including side frames 1, wheels 2, on axles 3 carries the truck bolster 4. The car body 5 with the car bolster 6 has a car center plate 7 which engages the truck bolster center plate 8 to support the car. Identical side bearings 9 and 10 extend upwardly from the truck bolster adjacent the opposite ends thereof toward the car body bolster.

The roller housing 11 projects upwardly from the car bolster 4. It is open at the top and defines a roller pocket at the bottom of which is a roller track 12 upwardly concave to support a free running roller 13, extending up above the top of the housing. The track 12 extends longitudinally of the housing and the roller is free to roll therealong, being limited in its travel by the roller housing end walls 14 and is guided by roller housing side walls 15. The curvature of the track tends normally to center the roller in the center of the housing.

Located above the roller housing is an apertured top or friction plate 16. Guide walls 17 extend downwardly form the top plate to enclose the upper portion of the roller housing 11, thus limiting horizontal displacement of the top plate with respect to the roller housing but leaving it free to move vertically with respect thereto.

Ears extend laterally from each side of the top plate adjacent the ends thereof and carry bosses 19 to center coil springs 20. Bosses 21 extending upwardly from the base of the side bearing center the lower ends of the coil springs 20.

The springs 20 urge the top plate upwardly away from the roller housing and into contact with the bearing or friction plate 22 on the car bolster 6, being preloaded to insure constant frictional contact between these two plates. As the car rocks from one side to the other, it compresses the springs on the down side, the springs on the up side expanding to maintain frictional contact. As the top plate on the down side approaches the roller housing, the roller 13 engages the bearing plate so that the pressure exerted by the tilting car is at that time supported partially by the springs and partially by the roller. This limits the frictional resistance between the bearing plate and the top plate so that the friction can never be great enough to interfere with the swivelling of the truck as it travels along the track about a curve.

The roller housing 11 is apertured for inspection of the roller and track and is apertured at least at one end below the walls 14 to permit insertion and withdrawal of the adjusting shims 23. Lugs 24 extend inwardly from the lower portion of the walls defining the end aperture so that when the car is jacked up and the roller 13 is raised, the track 12 and the shims 23 may be inserted above the shoulders or lugs 24, to drop down to be locked against longitudinal displacement in the roller housing, the side walls of the housing holding the track and shims in alignment.

The bearing base is recessed slightly at 25 to permit easy handling of the shims and track which are held in place without any other holding means and may be easily replaced or renewed for adjustment or to change in height of the roller 13.

The roller positively limits the maximum friction pressure that can be applied between the top plate and the bearing plate. The springs provide adequate friction at all times. Thus there can never be friction sufficient to lock the truck against pivotal movement about the center plate but there is always frictional resistance to damp out or inhibit excessive shimmy or oscillation.

A lug 26 projects laterally from the track 12 into an opening in the side wall of the housing to inhibit longitudinal displacement of the track.

As railroad freight train speeds increase, the prevention of harmonic shimmying has become of the utmost importance. This shimmying must be damped out to prevent derailment at high speeds but the friction damping effect must never reach a point where it locks the truck against swivelling because if that happens derailment is very likely to occur.

At high speeds a harmonic swivelling of the truck, a very rapid oscillating motion sometimes will occur as much as three and one-half cycles per second and such swivelling obviously is very dangerous as it can cause derailment and dangerous wear. The anti-shimmying effect must be present throughout all rocking positions of the car but it must not ever exceed a predetermined danger point where locking of the truck could occur.

For example, it has been found that a pressure of about four thousand pounds is sufficient to prevent or at least adequately inhibit shimmying when applied through such a friction plate as illustrated in this application. Much higher pressure will interfere with the normal and necessary freedom of the truck to negotiate a curve. Less pressure will not accomplish the purpose.

This invention therefore provides a controlled type of anti-shimmying damping resistance.

I claim:

1. A railroad car side bearing assembly, including opposed friction plates on the car body and the car truck, load supporting spring means between the car body and the truck, biasing the plates into constant frictional contact with each other as the car body rocks with respect to the truck, anti-friction means, normally out of contact with both plates, between the car body and the truck, so positioned that as the car rocks with respect to the truck, moving the plates toward the base which supports the spring means and increasing the pressure on the spring means, a point is reached at which the anti-friction means are contacted by one of the plates to positively inhibit further movement of such plate toward the base and prevent any increase in the spring carried load and in the pressure between the friction plates, the load resulting from the rocking of the car body with respect to the truck being thereafter divided between the spring means and the anti-friction plates.

2. The device of claim 1 characterized by the fact that the side bearing assembly includes a base, a generally rectangular open topped housing extending upwardly therefrom, a removable track socketed in the bottom of the housing, an anti-friction roller loosely enclosed within the housing free to roll along the track from end to end and guided by the housing, an apertured friction plate flanged to enclose and telescope with the upper portion of the housing, coil springs on the base outside the housing, yieldingly supporting the friction plate above the top of the housing, the roller extending upwardly from the housing into register with the aperture in the friction plate such a distance that, as the springs are compressed, the upper surface of the friction plate becomes tangent to the upper periphery of the roller before the friction plate can rest upon the housing, the aperture in the friction plate being of such length that when the roller is at the end of its excursion and projects above the friction plate, there is no contact between the friction plate and the roller.

3. The device of claim 2 characterized by removable shims socketed in the housing beneath the track.

4. The device of claim 2 characterized by the track being upwardly curved from the center toward each end thereof.

References Cited by the Examiner

UNITED STATES PATENTS

| 418,028 | 12/1889 | Jewett | 105—199 |
| 979,120 | 12/1910 | Woods | 303—226 |
| 983,080 | 1/1911 | O'Connor | 308—224 |
| 1,179,755 | 4/1916 | Price et al. | 308—138 |
| 1,208,838 | 12/1916 | Hennessey | 308—224 |
| 1,237,166 | 8/1917 | Burrmann | 105—199 |
| 1,545,747 | 7/1925 | Eaton | 105—199 |
| 1,993,104 | 3/1935 | Lamont | 105—200 |
| 2,227,140 | 12/1940 | Kjolseth | 105—199 |
| 2,680,413 | 6/1954 | Becker | 105—200 |

ARTHUR L. LA POINT, *Primary Examiner.*

H. BELTRAN, *Assistant Examiner.*